(12) United States Patent
Vandike et al.

(10) Patent No.: US 12,550,819 B2
(45) Date of Patent: Feb. 17, 2026

(54) RESIDUE SENSOR PROTECTION ON A HARVESTER

(71) Applicant: Deere & Company, Moline, IL (US)

(72) Inventors: Nathan R. Vandike, Geneseo, IL (US); Martin Franz Unterpaintner, Saarbrücken (DE); Benjamin Peschel, Contwig (DE); Stephen R. Corban, Geneseo, IL (US)

(73) Assignee: Deere & Company, Moline, IL (US)

( * ) Notice: Subject to any disclaimer, the term of this patent is extended or adjusted under 35 U.S.C. 154(b) by 456 days.

(21) Appl. No.: 18/299,291

(22) Filed: Apr. 12, 2023

(65) Prior Publication Data

US 2024/0341230 A1    Oct. 17, 2024

(51) Int. Cl.
*A01D 41/12*   (2006.01)
*A01D 41/127*  (2006.01)

(52) U.S. Cl.
CPC ....... *A01D 41/127* (2013.01); *A01D 41/1243* (2013.01)

(58) Field of Classification Search
CPC .......... A01F 29/12; A01F 29/01; A01F 29/04; A01F 29/09; A01D 41/1271; A01D 41/1243; A01D 41/127
See application file for complete search history.

(56) References Cited

U.S. PATENT DOCUMENTS

| | | | |
|---|---|---|---|
| 6,406,368 B1 | 6/2002 | Cruson et al. | |
| 6,939,221 B1 * | 9/2005 | Redekop | A01D 41/1243 460/111 |
| 7,485,035 B1 | 2/2009 | Yde | |
| 10,492,364 B2 | 12/2019 | Heitmann et al. | |
| 10,757,859 B2 | 9/2020 | Dima et al. | |
| 11,140,807 B2 | 10/2021 | Pfeiffer et al. | |
| 11,483,972 B2 | 11/2022 | Dima et al. | |
| 11,510,364 B2 | 11/2022 | Vandike et al. | |
| 11,647,694 B2 * | 5/2023 | Bussmann | A01D 41/1243 460/80 |
| 2003/0190939 A1 | 10/2003 | Bueermann | |
| 2005/0059445 A1 | 3/2005 | Niermann et al. | |
| 2005/0194473 A1 | 9/2005 | Pearson et al. | |
| 2006/0183519 A1 | 8/2006 | Benes | |
| 2007/0026912 A1 | 2/2007 | Anderson et al. | |
| 2007/0111766 A1 | 5/2007 | Holmen | |
| 2007/0275775 A1 | 11/2007 | Farley et al. | |
| 2008/0248843 A1 * | 10/2008 | Birrell | A01B 79/005 460/59 |
| 2008/0268927 A1 | 10/2008 | Farley et al. | |
| 2009/0005137 A1 | 1/2009 | Isaac et al. | |

(Continued)

FOREIGN PATENT DOCUMENTS

| BR | 102021011031 A2 | 1/2022 |
|---|---|---|
| BR | 102021011709 A2 | 12/2022 |

(Continued)

*Primary Examiner* — Adam J Behrens
(74) *Attorney, Agent, or Firm* — Kelly, Holt & Christenson; Joseph R. Kelly (57) ABSTRACT

A residue sensor is mounted to a combine harvester to sense a characteristic of residue. The residue sensor can be mounted to a spreader, to a sidewall of a chopper, or in a bypass system. The residue sensor can also be protected by an air curtain that directs air to inhibit contact between the residue sensor and the residue.

20 Claims, 9 Drawing Sheets

(56) References Cited

U.S. PATENT DOCUMENTS

| | | |
|---|---|---|
| 2009/0111548 A1 | 4/2009 | Landuyt |
| 2009/0253474 A1 | 10/2009 | Isaac |
| 2009/0287380 A1 | 11/2009 | Cherverika et al. |
| 2009/0325659 A1 | 12/2009 | Van Overschelde et al. |
| 2011/0045883 A1 | 2/2011 | Weichholdt et al. |
| 2011/0045884 A1 | 2/2011 | Weichholdt et al. |
| 2011/0093169 A1 | 4/2011 | Schroeder et al. |
| 2011/0130181 A1 | 6/2011 | Roberge et al. |
| 2011/0237316 A1 | 9/2011 | Isaac et al. |
| 2011/0270495 A1 | 11/2011 | Knapp |
| 2012/0178509 A1 | 7/2012 | Eggenhaus et al. |
| 2012/0270613 A1 | 10/2012 | Isaac et al. |
| 2013/0095899 A1 | 4/2013 | Knapp |
| 2013/0324199 A1 | 12/2013 | Roberge et al. |
| 2014/0031096 A1 | 1/2014 | Isaac et al. |
| 2014/0080555 A1 | 3/2014 | Wagner et al. |
| 2014/0171160 A1 | 6/2014 | Ricketts et al. |
| 2014/0302897 A1 | 10/2014 | Isaac et al. |
| 2015/0264864 A1 | 9/2015 | Branch et al. |
| 2015/0351321 A1 | 12/2015 | Shane |
| 2015/0373913 A1 | 12/2015 | Berry et al. |
| 2016/0088794 A1 | 3/2016 | Baumgarten et al. |
| 2016/0374267 A1* | 12/2016 | Reinecke ........... A01D 41/1243 239/666 |
| 2017/0034997 A1 | 2/2017 | Mayerle |
| 2017/0055445 A1 | 3/2017 | Mahieu et al. |
| 2017/0071125 A1 | 3/2017 | Pfeiffer et al. |
| 2017/0086372 A1 | 3/2017 | Palla et al. |
| 2017/0086373 A1 | 3/2017 | Mahieu et al. |
| 2017/0112055 A1 | 4/2017 | Depreitere et al. |
| 2017/0142900 A1 | 5/2017 | Mahieu et al. |
| 2017/0238463 A1 | 8/2017 | Van De Wege et al. |
| 2018/0007831 A1 | 1/2018 | Ballegeer et al. |
| 2018/0084718 A1 | 3/2018 | Baumgarten et al. |
| 2018/0092301 A1 | 4/2018 | Vandike et al. |
| 2018/0092302 A1 | 4/2018 | Vandike et al. |
| 2018/0368318 A1 | 12/2018 | Isaac et al. |
| 2019/0104681 A1 | 4/2019 | Carson et al. |
| 2019/0174674 A1 | 6/2019 | Diessner et al. |
| 2020/0060082 A1 | 2/2020 | Shinners et al. |
| 2020/0107502 A1 | 4/2020 | Mayerle et al. |
| 2020/0120869 A1 | 4/2020 | Vandike et al. |
| 2020/0296896 A1 | 9/2020 | Mayerle |
| 2020/0305352 A1* | 10/2020 | Bussmann ......... A01D 41/1243 |
| 2020/0323133 A1 | 10/2020 | Anderson et al. |
| 2020/0396904 A1 | 12/2020 | Faulkner et al. |
| 2021/0015039 A1* | 1/2021 | Vandike ................ G06T 7/0002 |
| 2021/0034867 A1 | 2/2021 | Ferrari et al. |
| 2021/0127573 A1* | 5/2021 | Mahieu ............. A01D 41/1243 |
| 2021/0195839 A1 | 7/2021 | Koch et al. |
| 2021/0282329 A1 | 9/2021 | Hall |
| 2021/0400870 A1 | 12/2021 | Sunil et al. |
| 2022/0110253 A1 | 4/2022 | Anderson et al. |
| 2022/0132742 A1 | 5/2022 | Faulkner et al. |
| 2022/0174873 A1 | 6/2022 | Topmöller et al. |
| 2022/0232768 A1 | 7/2022 | Craig |
| 2022/0346313 A1 | 11/2022 | Passchyn et al. |
| 2022/0354054 A1 | 11/2022 | Hermann |
| 2022/0361411 A1 | 11/2022 | Mayerle et al. |
| 2022/0361412 A1 | 11/2022 | Duquesne et al. |
| 2022/0369552 A1 | 11/2022 | Christiansen et al. |
| 2022/0369553 A1 | 11/2022 | Christiansen et al. |
| 2022/0369554 A1 | 11/2022 | Christiansen et al. |
| 2022/0375228 A1 | 11/2022 | Christiansen et al. |
| 2022/0394921 A1 | 12/2022 | Missotten et al. |
| 2022/0394923 A1 | 12/2022 | Christiansen et al. |
| 2022/0394924 A1 | 12/2022 | Christiansen et al. |
| 2022/0394925 A1* | 12/2022 | Missotten .......... A01D 41/1243 |
| 2022/0397417 A1 | 12/2022 | Christiansen et al. |
| 2022/0408642 A1 | 12/2022 | Bojsen |
| 2023/0026898 A1 | 1/2023 | Baes et al. |
| 2023/0028281 A1 | 1/2023 | Lorriette |
| 2023/0037095 A1 | 2/2023 | Mayerle |

FOREIGN PATENT DOCUMENTS

| | | | |
|---|---|---|---|
| CN | 108093830 A | 6/2018 | |
| DE | 102014005904 A1 | 10/2015 | |
| DE | 102014014049 A1 | 3/2016 | |
| EP | 0685151 B1 | 4/1999 | |
| EP | 1266553 B1 | 6/2006 | |
| EP | 1790207 B1 | 11/2009 | |
| EP | 1856966 B1 | 11/2009 | |
| EP | 1964465 B1 | 4/2013 | |
| EP | 2364587 B1 | 12/2013 | |
| EP | 2805603 A1 * | 11/2014 | ............ A01F 29/09 |
| EP | 2936961 A1 | 10/2015 | |
| EP | 2936962 A1 | 10/2015 | |
| EP | 2764764 B1 | 12/2015 | |
| EP | 3000302 A1 | 3/2016 | |
| EP | 3172959 A1 | 5/2017 | |
| EP | 3228174 A1 | 10/2017 | |
| EP | 3845050 A1 | 7/2021 | |
| EP | 4000373 A1 | 5/2022 | |
| EP | 3613272 | 8/2022 | |
| EP | 4091422 A1 | 11/2022 | |
| EP | 4091423 A1 | 11/2022 | |
| EP | 4091424 A1 | 11/2022 | |
| EP | 4094564 A1 | 11/2022 | |
| EP | 4101283 A1 | 11/2022 | |
| EP | 4101282 A1 | 12/2022 | |
| EP | 4104665 A1 | 12/2022 | |
| EP | 4115723 A1 | 1/2023 | |
| EP | 4129044 A1 | 2/2023 | |
| GB | 21082284 A1 | 6/2021 | |
| GB | 202108227 | 7/2021 | |
| GB | 2606740 A | 11/2022 | |
| GB | 2606741 A | 11/2022 | |
| GB | 2806741 A | 11/2022 | |
| IN | 202011006479 A | 8/2021 | |
| WO | 2003005803 A1 | 1/2003 | |
| WO | 2003039238 A1 | 5/2003 | |
| WO | 2017075002 A1 | 5/2017 | |
| WO | 2018076428 A1 | 5/2018 | |
| WO | 2018162699 A1 | 9/2018 | |
| WO | 2022243785 A1 | 11/2022 | |
| WO | 2022243786 A1 | 11/2022 | |

* cited by examiner

RESIDUE SENSOR PROTECTION ON A HARVESTER

FIELD OF THE DESCRIPTION

The present description relates to agricultural harvesters. More specifically, the present description relates to protecting a residue sensor on an agricultural harvester.

BACKGROUND

There are many different types of agricultural equipment. Some such equipment includes agricultural harvesters, such as combine harvesters.

Combine harvesters engage crop in a field, and process that crop to separate harvest material from residue. The harvest material is stored in a clean grain tank for later unloading. Non-crop material, referred to as residue, is passed through the combine harvester to a chopper where it is chopped into smaller pieces and may also be spread, by a spreader, on the field behind the 11 agricultural harvester.

The discussion above is merely provided for general background information and is not intended to be used as an aid in determining the scope of the claimed subject matter.

SUMMARY

A residue sensor is mounted to a combine harvester to sense a characteristic of residue. The residue sensor can be mounted to a spreader, to a sidewall of a chopper, or in a bypass system. The residue sensor can also be protected by an air curtain that directs air to inhibit contact between the residue sensor and the residue.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

As discussed above, agricultural harvesters often include a residue handling system that includes a chopper that chops residue into relatively small pieces. The residue handling system may also include a spreader that spreads the residue on the field behind the agricultural harvester as the agricultural harvester travels over the field. Some current harvesters include a residue sensor that senses a characteristic of the residue. In one example, the residue sensor is an optical sensor, or camera, that captures images (still images or video images) of the residue as it passes the camera.

Residue sensors present some problems. In order to obtain images of the residue (or to sense another characteristic) the residue sensor must be exposed to (e.g., mounted near or in) the path of the residue as the residue moves through the agricultural harvester. However, as the residue travels through different points in the harvester, the residue can contain a great deal of energy, depending on the speed of the chopper and/or the speed of the spreader. By way of example, some choppers travel at a speed of 2500-3000 revolutions per minute (RPMs). Therefore, residue such as rocks, corn cobs, etc., that pass through the chopper can impart high energy impacts to the residue sensor, which can damage or destroy the sensor.

One current approach to protecting the residue sensor includes mounting the sensor behind a ramp so that as residue travels through the harvester along a residue travel path and approaches the residue sensor, the residue is directed by the ramp to travel over the residue sensor. In another example, the residue sensor is a camera, the camera may capture an image of the residue using a lens that is exposed to the residue travel path through a sensor surface that is covered with a glass or another clear material to protect the residue sensor. Extra protective material is disposed over the camera lens (such as an extra layer of glass) to protect the sensor from high energy impacts of residue material that may otherwise damage the sensor.

The present discussion proceeds with respect to an agricultural harvester that includes a residue sensor (such as an optical sensor) that is mounted to a residue handling system. For instance, the residue sensor can be mounted to a spreader housing to which a spreader is mounted. The residue sensor may be mounted on a floor of the spreader housing or elsewhere on the spreader housing. The spreader housing may include fixed and/or movable shrouds. The residue sensor can be mounted to the fixed or movable shrouds. The spreader may include a tail 11 board with the residue sensor mounted to the tail board. The residue sensor may also be mounted to a sidewall of the chopper housing to which a chopper is mounted. In another example, an air nozzle can introduce an air curtain proximate the residue sensor to inhibit residue from impacting the residue sensor. The air nozzle can be used by itself, or in conjunction with a ramp, or in conjunction with other protective structures. In yet another example, the residue sensor is mounted relative to a secondary residue travel path. Some of the residue is diverted from a primary residue travel path into the secondary residue travel path. The sensor senses the characteristic of the residue in the secondary residue travel path and the residue can then be dumped from the secondary residue travel path onto the field or reintegrated back into the primary residue travel path.

Figure 1A:
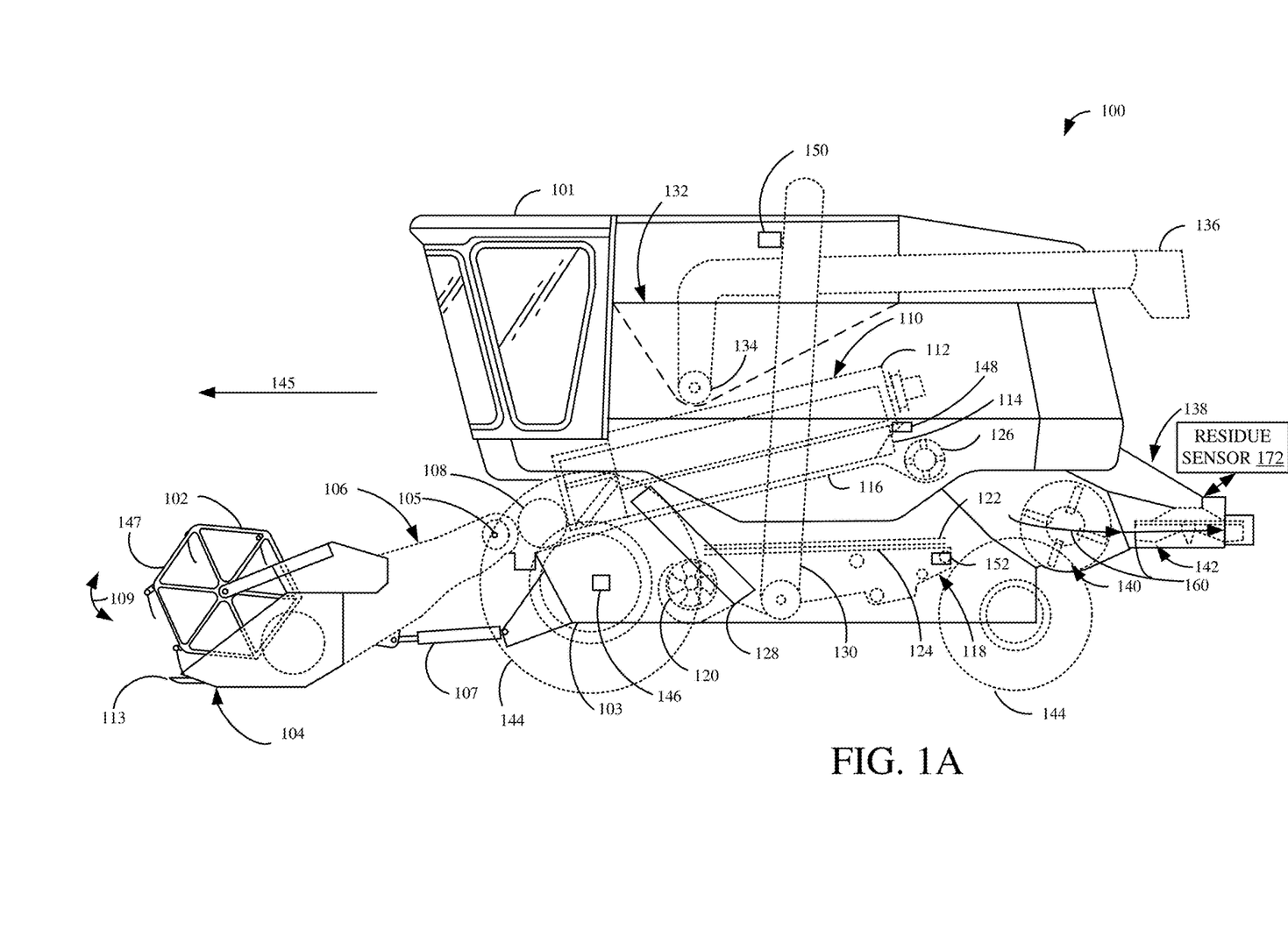
FIG. 1A is a partial pictorial, partial schematic view of a combine harvester with an active spreading system.

FIG. 1A is a partial pictorial, partial schematic, illustration of a self-propelled agricultural harvester 100. In the illustrated example, agricultural harvester 100 is a combine harvester. Further, although combine harvesters are provided as examples throughout the present description, it will be appreciated that the present description is also applicable to other types of harvesters, such as cotton harvesters, sugarcane harvesters, self-propelled forage harvesters, windrowers, or other agricultural work machines. Consequently, the present disclosure is intended to encompass the various types of harvesters mentioned above and is, thus, not limited to combine harvesters.

As shown in FIG. 1A, agricultural harvester 100 illustratively includes an operator compartment 101, which can have a variety of different operator interface mechanisms, for controlling agricultural harvester 100. Agricultural harvester 100 includes front-end equipment, such as a header 102, and a cutter generally indicated at 104. Agricultural harvester 100 also includes a feeder house 106, a feed accelerator 108, and a thresher generally indicated at 110. The feeder house 106 and the feed accelerator 108 form part of a material handling subsystem. Header 102 is pivotally coupled to a frame 103 of agricultural harvester 100 along pivot axis 105. One or more actuators 107 drive movement of header 102 about axis 105 in the direction generally indicated by arrow 109. Thus, a vertical position of header 102 (the header height) above the 6 ground over which the header 102 travels is controllable by actuating actuator 107. While not shown in FIG. 1A, agricultural harvester 100 may also include one or more actuators that operate to apply a tilt angle, a roll angle, or both to the header 102 or portions of header 102. Tilt refers to an angle at which the cutter 104 engages the crop. The tilt angle is increased, for example, by controlling header 102 to point a distal edge 113 of cutter 104 more toward the ground. The tilt 11 angle is decreased by controlling header 102 to point the distal edge 113 of cutter 104 more away from the ground. The roll angle refers to the orientation of header 102 about the front-to-back longitudinal axis of agricultural harvester 100.

Thresher 110 illustratively includes a threshing rotor 112 and a set of concaves 114. Further, agricultural harvester 100 also includes a separator 116. Agricultural harvester 100 also includes a cleaning subsystem or cleaning shoe (collectively referred to as cleaning subsystem 118) that includes a cleaning fan 120, chaffer 122, and sieve 124. The material handling subsystem also includes discharge beater 126, tailings elevator 128, clean grain elevator 130, as well as unloading auger 134 and spout 136. The clean grain elevator moves clean grain into clean grain tank 132. Agricultural harvester 100 also includes a residue handling system 138 that can include chopper 140 and spreader 142. Agricultural harvester 100 also includes a propulsion subsystem that includes an engine that drives ground engaging components 144, such as wheels or tracks. In some examples, a combine harvester within the scope of the present disclosure may have more than one of any of the subsystems mentioned above. In some examples, agricultural harvester 100 may have left and right cleaning subsystems, separators, etc., which are not shown in FIG. 1A.

In operation, and by way of overview, agricultural harvester 100 illustratively moves through a field in the direction indicated by arrow 145. As agricultural harvester 100 moves, header 102 (and the associated reel 147) engages the crop to be harvested and gathers the crop toward cutter 104.

An operator of agricultural harvester 100 can be a local human operator, a remote human operator, or an automated system. An operator command is a command by an operator. The operator of agricultural harvester 100 may determine one or more of a height setting, a tilt angle setting, or a roll angle setting for header 102. For example, the operator inputs a setting or settings to a control system, that controls actuator 107. The control system may also receive a setting from the operator for establishing the tilt angle and roll angle of the header 102 and implement the inputted settings by controlling associated actuators, not shown, that operate to change the tilt angle and roll angle of the header 102. The actuator 107 maintains header 102 at a height above the ground based on a height setting and, where applicable, at desired tilt and roll angles. Each of the height, roll, and tilt settings may be implemented independently of the others. The control system responds to header error (e.g., the difference between the height setting and measured height of header 102 above the ground and, in some examples, tilt angle and roll angle errors) with a responsiveness that is determined based on a selected sensitivity level. If the sensitivity level is set at a greater level of sensitivity, the control system responds to smaller header position errors, and attempts to reduce the detected errors more quickly than when the sensitivity is at a lower level of sensitivity.

Returning to the description of the operation of agricultural harvester 100, after crops are cut by cutter 104, the severed crop material is moved through a conveyor in feeder house 106 toward feed accelerator 108, which accelerates the crop material into thresher 110. The crop material is threshed by rotor 112 rotating the crop against concaves 114. The threshed crop material is moved by a separator rotor in separator 116 where a portion of the residue is moved by discharge beater 126 toward the residue handling system 138. The portion of residue transferred to the residue handling system 138 is chopped by residue chopper 140 and spread on the field by spreader 142. In other configurations, the residue is released from the agricultural harvester 100 in a windrow. In other examples, the residue handling system 138 can include a tail board (described below), weed seed eliminators (not shown) such as seed baggers or other seed collectors, or seed crushers or other seed destroyers.

Grain falls to cleaning subsystem 118. Chaffer 122 separates some larger pieces of material from the grain, and sieve 124 separates some of finer pieces of material from the clean grain. Clean grain falls to an auger that moves the grain to an inlet end of clean grain elevator 130, and the clean grain elevator 130 moves the clean grain upwards, depositing the clean grain in clean grain tank 132. Residue is removed from the cleaning subsystem 118 by airflow generated by cleaning fan 120. Cleaning fan 120 directs air along an airflow path upwardly through the sieves and chaffers. The airflow carries residue along a residue travel path rearwardly in agricultural harvester 100 toward the residue handling system 138.

Tailings elevator 128 returns tailings to thresher 110 where the tailings are re-threshed. Alternatively, the tailings also may be passed to a separate re-threshing mechanism by a tailings elevator or another transport device where the tailings are re-threshed as well.

FIG. 1A also shows that, in one example, agricultural harvester 100 includes ground speed sensor 146, one or more separator loss sensors 148, a clean grain camera 150, which May be in the form of a stereo or mono camera, and one or more loss sensors 152 provided in the cleaning subsystem 118. Agricultural harvester 100 can also include a residue sensor 172 that is mounted to residue handling system 138 to sense a characteristic of the residue, as described in greater detail below.

Ground speed sensor 146 senses the travel speed of agricultural harvester 100 over the ground. Ground speed sensor 146 may sense the travel speed of the agricultural harvester 100 by sensing the speed of rotation of the ground engaging components (such as wheels or tracks), a drive shaft, an axel, or other components. In some instances, the travel speed may be sensed using a geographic location sensor, such as a global positioning system (GPS), another global navigation satellite system (GNSS), a dead reckoning system, a cellular triangulation system, or a wide variety of other systems or sensors that provide an indication of the location of the agricultural harvester 100 in a global or local coordinate system. Travel speed can be sensed or derived from a plurality of outputs from the sensor.

Loss sensors 152 illustratively provide an output signal indicative of the quantity of grain loss occurring in both the right and left sides of the cleaning subsystem 118. In some examples, sensors 152 are strike sensors which count grain strikes per unit of time or per unit of distance traveled to provide an indication of the grain loss occurring at the cleaning subsystem 118. The strike sensors for the right and left sides of the cleaning subsystem 118 may provide individual signals or a combined or aggregated signal. In some examples, sensors 152 may include a single sensor as opposed to separate sensors provided for each cleaning subsystem 118.

Separator loss sensor 148 provides a signal indicative of grain loss in the left and right separators, not separately shown in FIG. 1A. The separator loss sensors 148 may be associated with the left and right separators and may provide separate grain loss signals or a combined or aggregate signal. In some instances, sensing grain loss in the separators may also be performed using a wide variety of different types of sensors as well.

Agricultural harvester 100 may also include other sensors and measurement mechanisms. For instance, agricultural harvester 100 may include one or more of the following sensors: a header height sensor that senses a height of header 102 above the ground; mechanical stability sensors that sense oscillation or bouncing motion (and amplitude) of agricultural harvester 100; a residue setting sensor that is configured to sense whether agricultural harvester 100 is configured to chop and spread the residue, produce a windrow, etc.; a cleaning shoe fan speed sensor to sense the speed of fan 120; a concave clearance sensor that senses clearance between the rotor 112 and concaves 114; a threshing rotor speed sensor that senses a rotor speed of rotor 112; a chaffer clearance sensor that senses the size of openings in chaffer 122; a sieve clearance sensor that senses the size of openings in sieve 124; a material other than grain (MOG) moisture sensor that senses a moisture level of the MOG passing through agricultural harvester 100; one or more machine setting sensors configured to sense various configurable settings of agricultural harvester 100; a machine orientation sensor that senses the orientation of agricultural harvester 100; and crop property sensors that sense a variety of different types of crop properties, such as crop type, crop moisture, and other crop properties. Crop property sensors may also be configured to sense characteristics of the severed crop material as the crop material is being processed by agricultural harvester 100. For example, in some instances, the crop property sensors may sense grain quality such as broken grain, MOG levels; grain constituents such as starches and protein; and grain feed rate as the grain travels through the feeder house 106, clean grain elevator 130, or elsewhere in the agricultural harvester 100. The crop property sensors may also sense the feed rate of biomass through feeder house 106, through the separator 116 or elsewhere in agricultural harvester 100. The crop property sensors may also sense the feed rate as a mass flow rate of grain through elevator 130 or through other portions of the agricultural harvester 100 or provide other output signals indicative of other sensed variables.

Figure 1B:
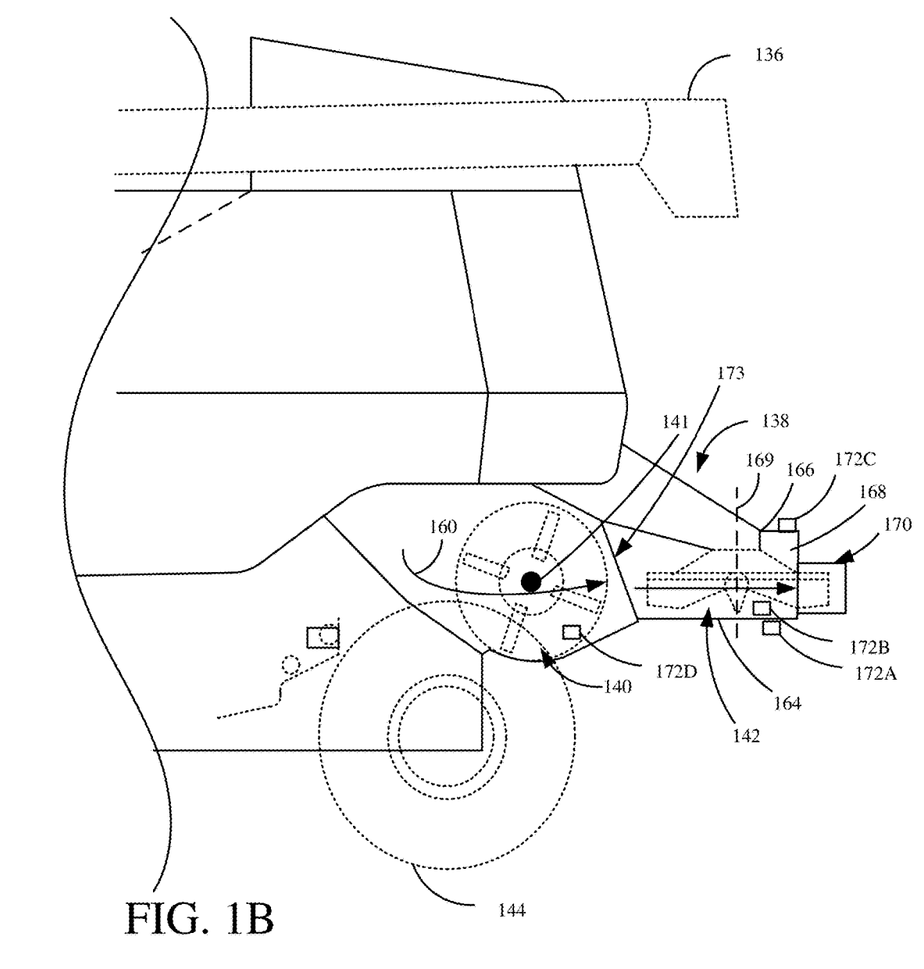
FIG. 1B is an enlarged view of a portion of the combine harvester shown in FIG. 1A.

In the example shown in FIG. 1A, residue travels in the direction generally indicated by arrows 160, through chopper 140, and through spreader 142. FIG. 1B shows a portion of harvester 100 in more detail. Chopper 140 is mounted to a chopper housing 173 through which the residue travels. Similarly, spreader 142 can be mounted within a spreader housing 168 that includes a floor 164 and a ceiling 166, as well as one or more housing sidewalls. Similarly, shrouds 170 can be fixed or movable, or both, and can be used to direct the trajectory of the residue (the path of the residue traveling through space) as it exits out of combine harvester 100. The use of shrouds 170 to direct the trajectory of residue as it exits combine 100 is described in greater detail below.

In the example shown in FIG. 1B, residue sensor 172 can be mounted to the floor 164 of the spreader housing 168 that houses spreader 142, such as in the position illustrated by residue sensor 172A. In another example, the residue sensor 172 can be mounted to a sidewall of the spreader housing 168, such as in the position shown by residue sensor 172B. Similarly, the residue sensor 172 can be mounted to the ceiling 166 of spreader housing 168 as indicated by residue sensor location 172C.

Also, the chopper housing 173 to which chopper 140 is mounted may include sidewalls so that the residue sensor 172 may be mounted to the sidewall of chopper housing 173 (a wall that is generally perpendicular to the axis of rotation 141 of chopper 140), as indicated by sensor location 172D. The residue sensor 172 can be mounted in other locations as well, some of which are described below.

Figure 1C:
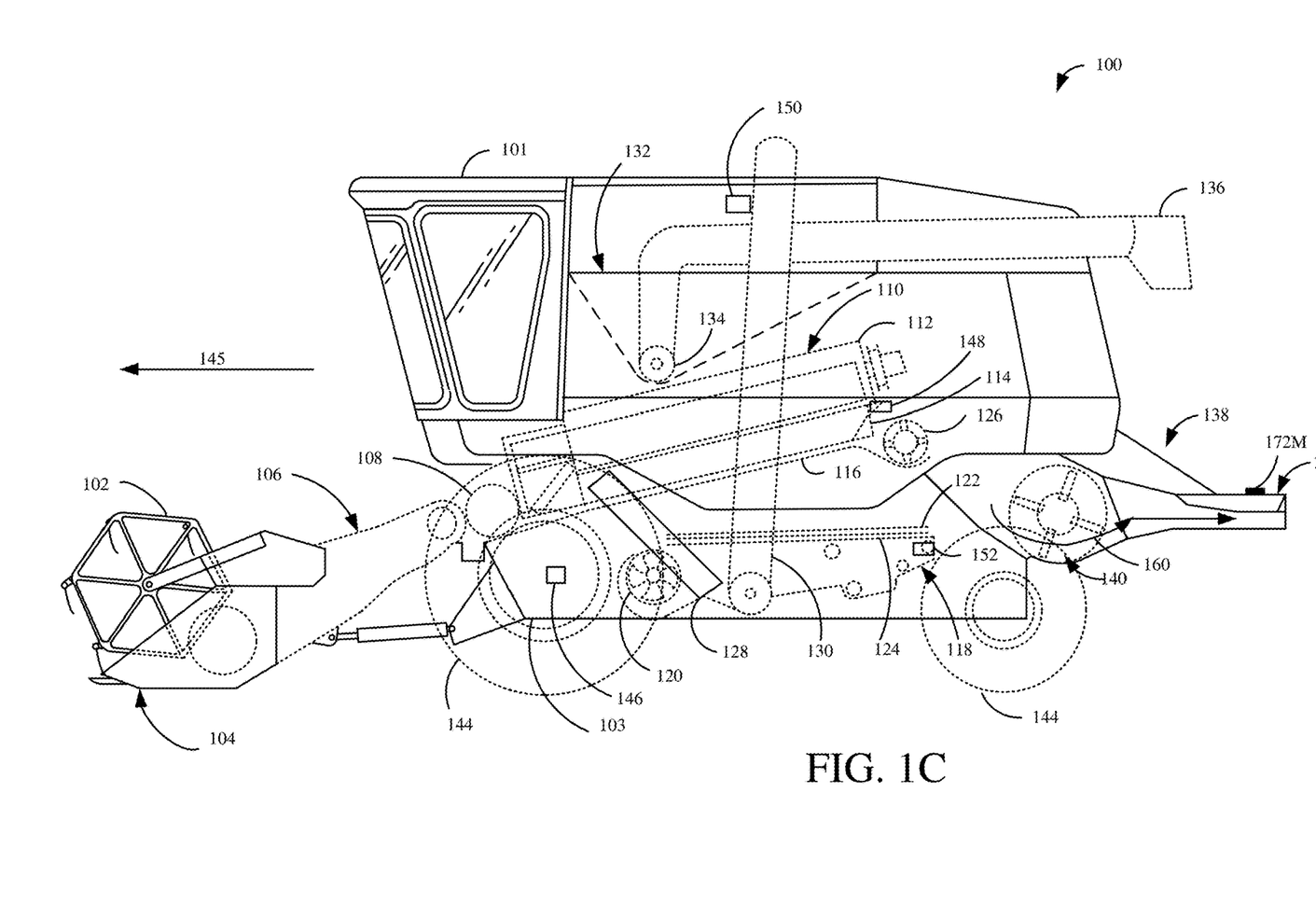
FIG. 1C is an enlarged view of a combine harvester with a passive spreading system.

FIG. 1C is similar to FIG. 1A and similar items are similarly numbered. However, agricultural harvester 100 in FIG. 1C has a passive spreading system (e.g., tail board) 240 that has a housing with a ceiling and protruding vanes (shown in more detail below). Residue travels along residue travel path 160 and is spread by the vanes on tail board 240. In the example shown in FIG. 1C, and as described in more detail below with respect to FIG. 7, residue sensor 172 can be mounted to the ceiling of the spreader board as shown by sensor location 172M in FIG. 1C.

Figure 2:
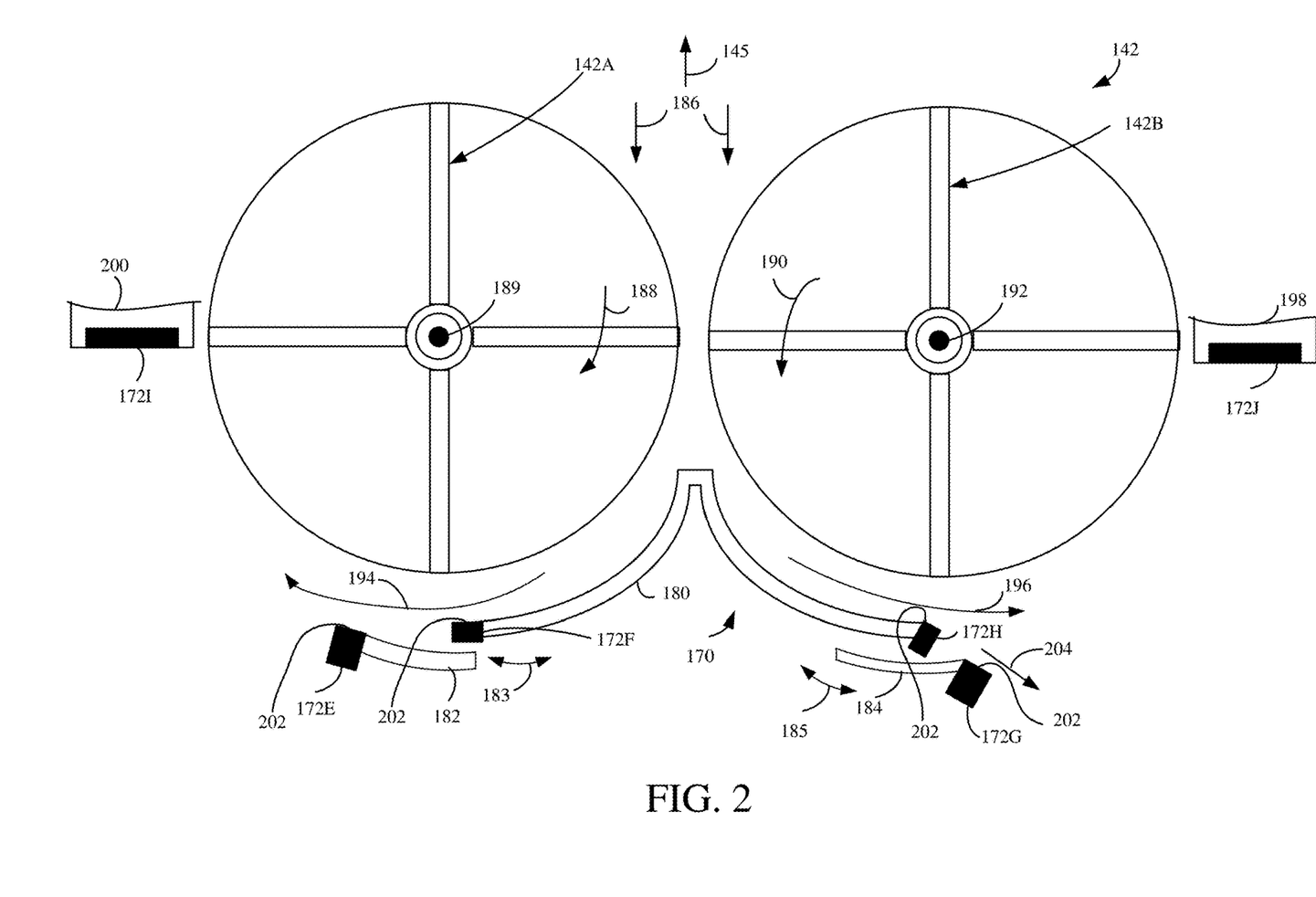
FIG. 2 is a top view of a portion of one example of a spreader.

FIG. 2 is a top view of one example of a portion of spreader 142. In the example shown in FIG. 2, spreader 142 includes a pair of spreader mechanisms 142A and 142B. Shrouds 170 include a fixed shroud 180 and a set of movable shrouds 182 and 184. Residue enters the spreader generally in the direction indicated by arrows 186. Spreader 142A rotates about axis of rotation 189 in the direction indicated by arrow 188 while spreader 142B rotates about an axis of rotation 192 in the direction indicated by arrow 190.

The trajectory of the residue, as it exits the spreader 142, is influenced by fixed shroud 180 and the position of movable shrouds 182 and 184. Shroud 182 is illustratively mounted for movement in the direction indicated by arrow 183. Shroud 184 is illustratively mounted for movement in the direction indicated by arrow 185. Shrouds 182 and 184 can be moved to an extended position (shown with respect to shroud 182) or a retracted position (shown with respect to shroud 184). When in the more extended position illustrated by shroud 182, shroud 182 directs the trajectory of the residue more to the side of agricultural harvester 100 (with respect to the direction of travel 145) as indicated by arrow 194. When in the more retracted position illustrated by shroud 184, the trajectory of the material is directed more rearwardly with respect to the direction of travel 145, as indicated by arrow 196.

Also, in one example, the agricultural harvester 100 can include a set of side deflectors 198 and 200, which may be mounted to the frame of agricultural harvester 100, or the spreader housing, or the chopper housing, or elsewhere, and which extend in a direction transverse to the direction of travel 145, along the sides of the spreader mechanisms 142A and 142B, to prevent material from being thrown forward (in the direction of travel 145 of agricultural harvester 100).

In various examples, it will be noted that one or more residue sensors 172 can be mounted at a variety of different locations illustrated in FIG. 2. FIG. 2 shows that, in one example, a residue sensor 172 can be mounted at a plurality of different locations illustrated in FIG. 2 as locations 172E, 172F, 172G, 172H, 172I, and/or 172J. In one example, sensor 172 has a sensor surface 202 that is exposed to the residue travel path to sense a characteristic of the residue traveling along the residue travel path. For instance, sensor 172 may be an optical sensor that captures an image (static or video) of the residue through the sensor surface 202 (which may be a lens or a covering over a lens, or another sensor surface 202). Shrouds 180, 182, and 184 may have a residue-facing surface that faces the residue travel path 194, 196.

When residue sensor 172 is mounted at location 172E, the sensor surface 202 is illustratively mounted flush with the residue facing surface (the surface facing spreader element 142A) of movable shroud 182. Because the sensor 172 is mounted to the outer or distal end of movable shroud 182, this increases the likelihood that the residue is traveling more uniformly in the direction indicated by arrow 194 than if the sensor 172 is located more closely to the center of the two spreader elements 142A and 142B. Sensor 172 can also be located at location 172F where spreader 172 is mounted to the outer end of the fixed shroud 180. In both of the examples shown at locations 172E and 172F, the sensor surface 202 of sensor 172 (facing the spreader mechanism 142A), is generally coplanar with the residue-facing surface of the shroud to which sensor 172 is mounted. Because the sensor 172 is not significantly protruding inwardly beyond the residue-facing surface of the shroud to which the sensor 172 is mounted, this reduces the likelihood that sensor 172 will encounter a high energy impact from residue. In another example, the sensor surface 202 may be recessed from the residue-facing surface of the shroud to further reduce the likelihood of impact with residue. By recessed it is meant, in one example, that the sensor surface 202 that is exposed to the residue is located at a distance that is further away from the residue travel path in the agricultural harvester 100 than the residue-facing surface of the housing to which sensor 172 is mounted. Therefore, in such an example, sensor 172 does not protrude into the housing to which sensor 172 is mounted, toward the residue travel path, but is instead located a distance that is the same as, or greater than, the distance that residue-facing surface of the housing to which sensor 172 is mounted is located from the residue travel path.

Sensor 172 can also be mounted at a location 172G, which is similar to location 172E, except that sensor location 172G is on the end of movable shroud 184. Also, it can be seen that the sensing surface 202 of sensor 172 in location 172G is angled outwardly with respect to the residue-facing surface of movable shroud 184, in the direction generally indicated by arrow 204. Therefore, the sensing surface 202 of sensor 172 (in location 172G) is angled away from the residue travel path 196, making it even less likely that sensor surface 202 will receive an impact from residue.

In another example, sensor 172 can be mounted at location 172H which is similar to location 172F. However, in the example in which sensor 172 is mounted at location 172H, sensor 172 also has its sensing surface 202 angled away from the residue-facing surface of shroud 180, also generally in the direction indicated by arrow 204. Thus, when mounted as illustrated at position 172H, it is unlikely that the sensing surface 202 of sensor 172 will receive an impact from residue, because the sensing surface is angled away from the residue travel path 196 of the residue exiting the spreader 142.

When the sensor 172 is located on the side panels or side deflectors 198 and/or 200 (at locations 172I and 172J), that location is spaced from the exit end of the spreader mechanisms 142A and 142B (defined by the ends of shrouds 182 and 184) by a sufficient distance that the energy in the elements of residue will have somewhat dissipated. Thus, mounting the sensor 172 at locations 172I and/or 172J reduces the likelihood that the sensor 172 will receive a high energy impact from residue after the residue exits from the spreader 142.

Figure 3:
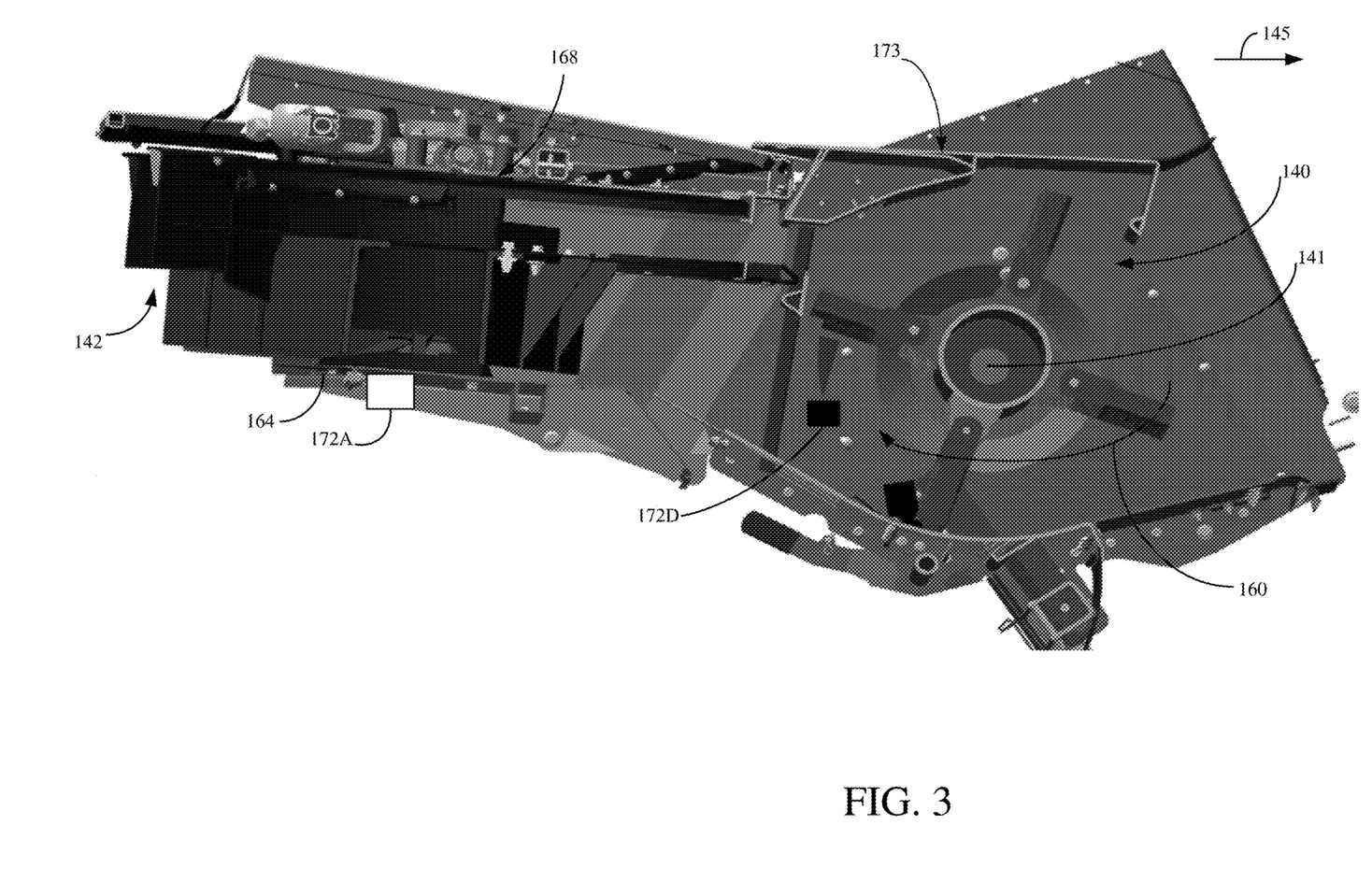
FIG. 3 is a side view of a portion of a residue handling system in the combine harvester showing a chopper and a spreader.

FIG. 3 shows another example of chopper 140 and spreader 142, in more detail. Again, in the example shown in FIG. 3, the arrow 145 illustrating the direction of travel of agricultural harvester 100 is illustrated for the purpose of clarity. In the example shown in FIG. 3, sensor 172 is shown mounted at location 172A in the floor 164 of the spreader housing 168 that encloses a portion of spreader 142. FIG. 3 also shows that residue sensor 172 can be located at location 172D in the residue-facing wall of the chopper housing 173 that houses chopper 140. As discussed above, when sensor 172 is located in the floor of spreader housing 168 as indicated by location 172A or the sidewall of chopper housing 173, as illustrated at location 172D, then the sensing surface 202 of the sensor 172 is illustratively mounted flush (e.g., coplanar) with (or 9 recessed from) the floor of housing 168 and/or the sidewall of housing 173 to reduce the likelihood of the sensing surface 202 of sensor 172 receiving an impact from residue traveling through spreader 142 or chopper 140.

Figure 4:
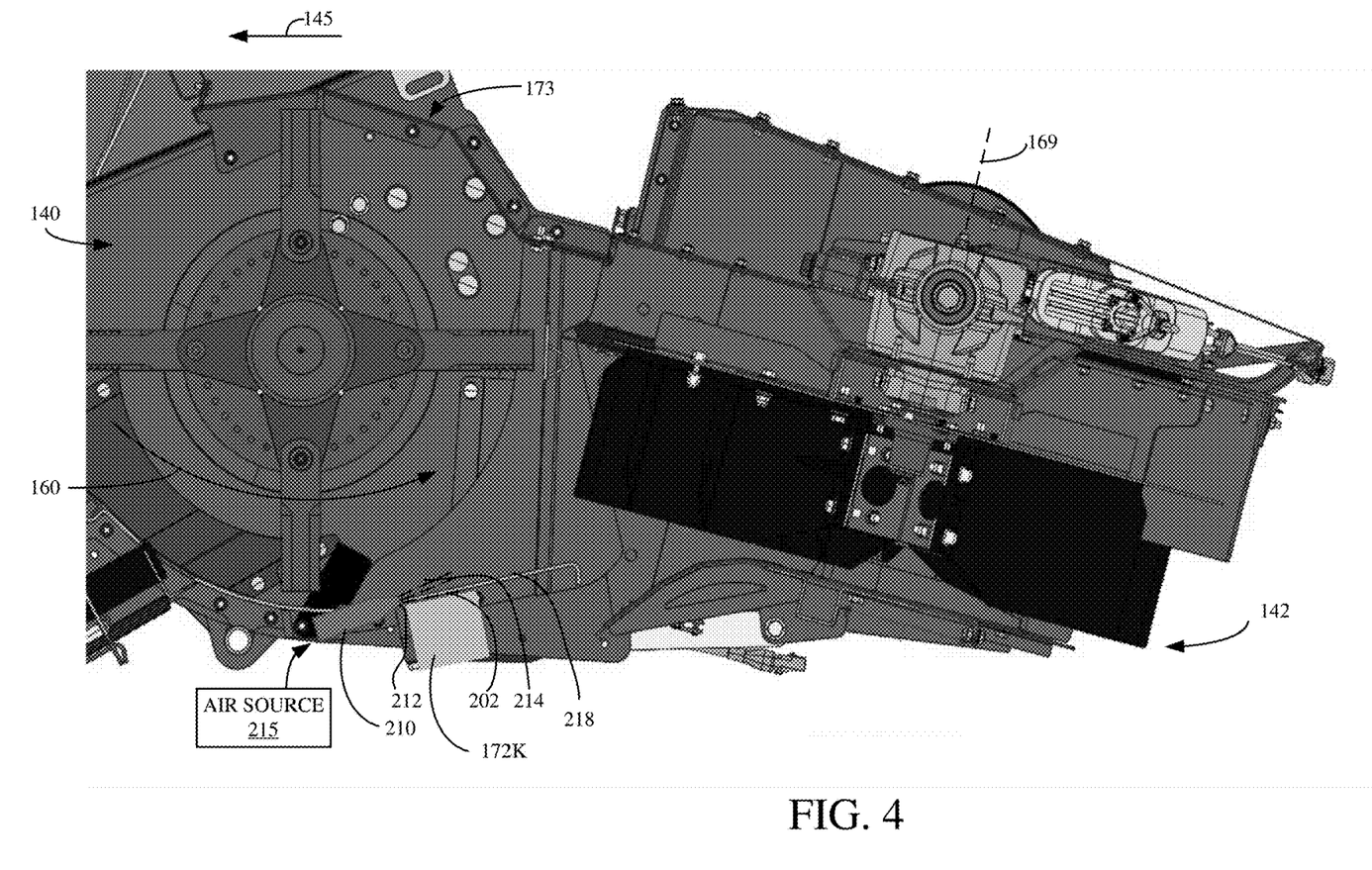
FIG. 4 is a side view of a portion of a residue handling system in the combine harvester showing a chopper and a spreader with an air nozzle deploying an air curtain over a residue sensor.

FIG. 4 is also an enlarged view of residue handling system 138 of agricultural harvester 100, in an example in which residue handling system 138 includes chopper 140 and spreader 142. Similar items to those shown in previous figures are similarly numbered. Again, for the sake of orientation, arrow 145 which illustrates the direction of travel of harvester 100 is also illustrated in FIG. 4. In FIG. 4, residue sensor 172 is mounted to the floor of chopper housing 173 173 that houses chopper 140. The sensor surface 202 is configured to be generally flush with, or coplanar with, or recessed from, a residue-facing surface 218 of the floor in the chopper housing 19 that houses chopper 140. In the example shown in FIG. 4, an air nozzle 210 is mounted to direct air from an output end (or nozzle tip) 212 into the housing that houses chopper 140. Air, under pressure, is provided by air source 215. Air source 215 may be a source of compressed air generated elsewhere on agricultural harvester 100, or from a compressor dedicated to providing pressurized air to nozzle 210, or another air source. In the example shown in FIG. 4, nozzle 210 has a flat and elongate end (or nozzle tip) 212 (elongate in the direction into and out of the page of FIG. 4) to provide an air curtain depicted generally at 214 over the top of the sensor surface 202 of sensor 172 in the location 172K. Nozzle 210 could also be a plurality of nozzles mounted adjacent one another or in another way to provide air flow as shown at 214 over sensor surface 202. Therefore, any residue particles that are being processed by chopper 140, and that have a trajectory toward the sensor surface 202 of the sensor 172 in location 172K will be inhibited by the air curtain 214 from impacting sensor surface 202 with a high energy impact. Air curtain 214 will at least dissipate some of the energy in the residue, as it travels toward the sensor surface 202 of sensor 172, to reduce the force of impact imparted by the piece of residue and to, in many cases, completely inhibit the impact of residue against sensor surface 202.

Figure 5:
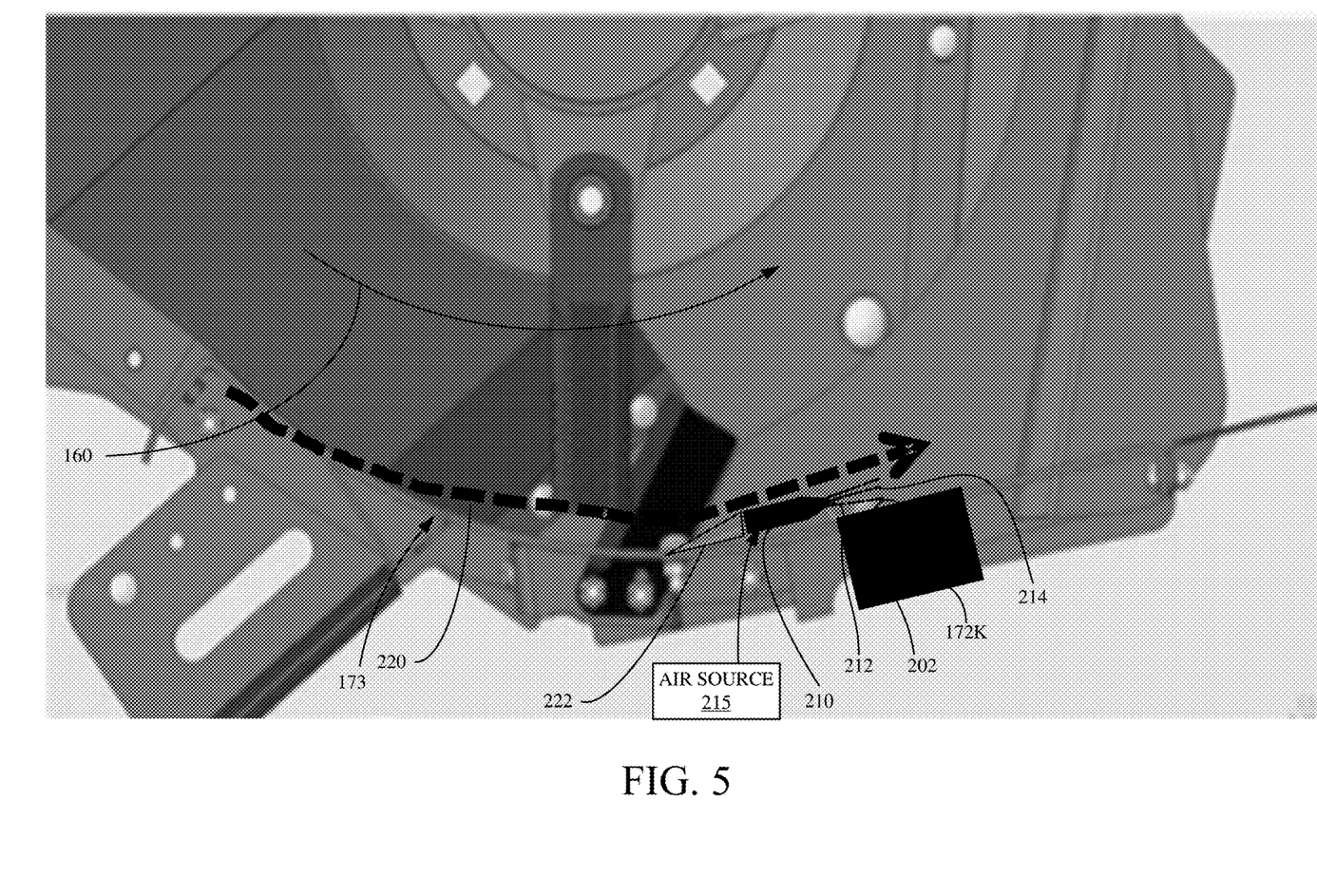
FIG. 5 is an enlarged side view of a portion of a chopper of a combine harvester with an air nozzle positioned proximate a ramp to protect a residue sensor from impact by residue.

FIG. 5 is an enlarged view of a portion of chopper 140 with sensor 172 mounted to the floor of the housing 173 that houses chopper 140, at the location 172K discussed above with respect to FIG. 4. Items that are similar to those shown in FIG. 4 are similarly numbered. However, FIG. 5 also shows that not only can residue travel generally along the path 160, but residue that is at the distal or outer ends of the cutting knives on cutter 140 may travel along the surface of the housing 173 that houses cutter 140, along the direction generally indicated by arrow 220. FIG. 5 thus shows that, in one example, a structural ramp 222 can be configured upstream of air nozzle 210 with respect to the direction of residue flow indicated by arrow 220. Ramp 222 may be a structural metal ramp or other structural element that extends inwardly and outwardly with respect to the page of FIG. 5 by a distance sufficient to protect the sensor 172 and/or air nozzle 210 and/or to facilitate material flow over the air nozzle 210. Therefore, as particles of residue travel along the path indicated by arrow 220, those particles of residue may be diverted upward along ramp 222 so that the particles of residue travel over air nozzle 210 and over the sensor surface 202 of sensor 172. Thus, ramp 222 inhibits the residue particles from impacting the sensor surface 202. In addition, the air curtain 214 further inhibits any particles of residue from engaging the sensor surface 202 of sensor 172 with a high energy impact, as discussed above with respect to FIG. 4.

Figure 6:
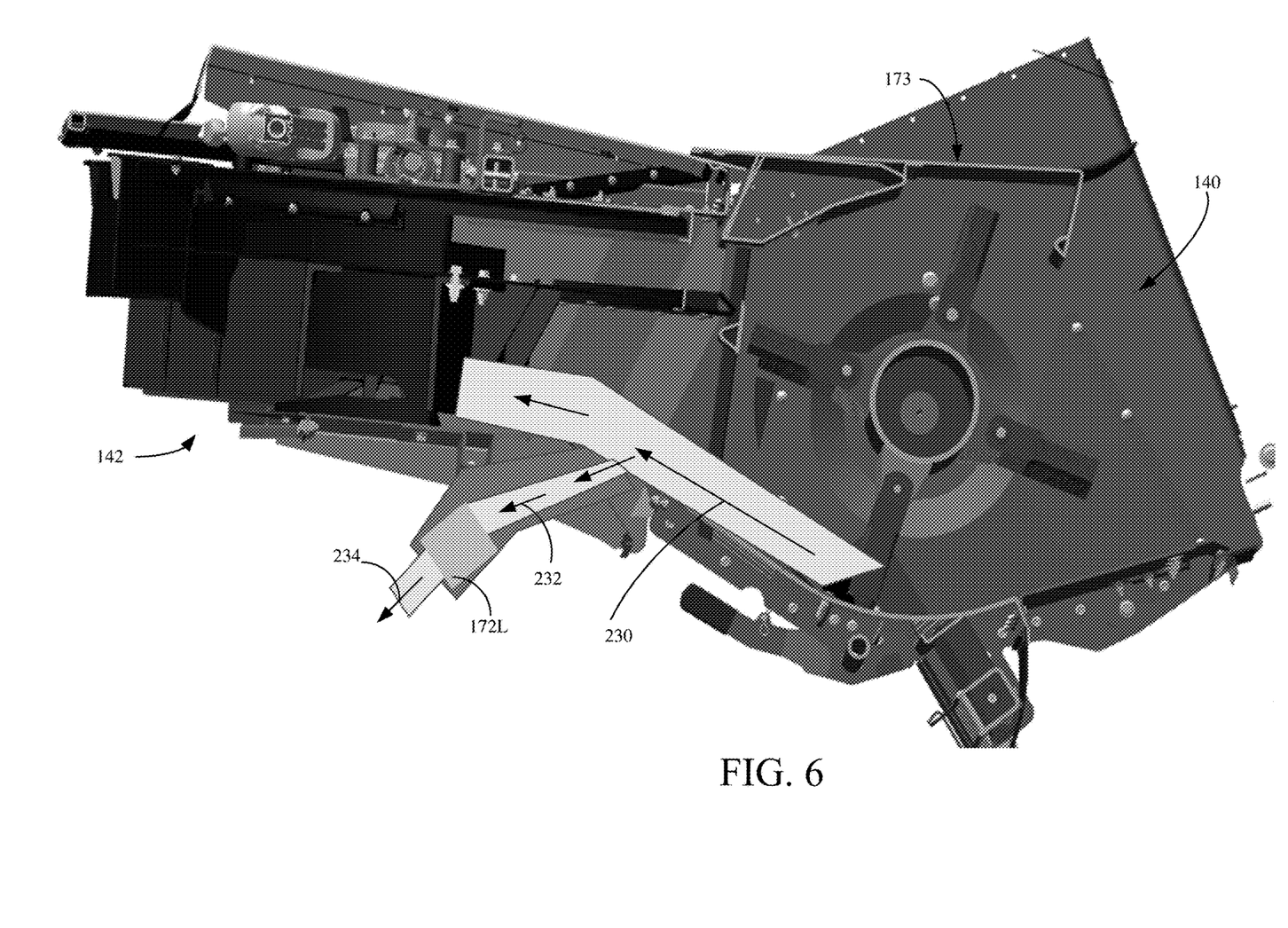
FIG. 6 is a side view of a portion of a residue handling system in the combine harvester showing a residue sensor deployed in a secondary residue travel path.

FIG. 6 is similar to FIG. 3, and similar items are similarly numbered. However, instead of mounting residue sensor 172 to the wall of the housing 173 that houses cutter 140, or to the floor of the housing 168 that houses spreader 142, FIG. 6 shows that after the residue exits cutter housing 173 along a primary travel path indicated by arrow 230, some of the residue is diverted (with airflow or with a mechanical diverting member or otherwise) along a secondary travel path indicated by arrow 232. Because the residue is diverted along the secondary travel path 232, the diverted residue loses a significant amount of the energy that the residue contains when leaving the chopper 140. Therefore, the residue traveling along secondary travel path 232 has a different trajectory from the residue traveling along the primary travel path 230. The residue traveling along secondary travel path 232 may also have lower energy (e.g., slower speed) than the residue traveling along the primary travel path 230.

In the example illustrated in FIG. 6, sensor 172 is mounted at a location 172L on the wall of the structure that defines the secondary travel path 232. In the example shown in FIG. 6, the sensor surface of sensor 172 is mounted flush with (e.g., coplanar with) or recessed from the residue-facing surface of the wall defining the secondary travel path 232 to reduce the likelihood that the sensor surface will receive an impact from any residue items traveling along the secondary travel path 232. Also, the residue traveling along the secondary travel path 232 may flow continuously along the secondary travel path 232 or intermittently. For instance, the residue flowing along secondary travel path 232 may be intermittently allowed into path 232 so that some flow of residue from primary travel path 230 is intermittently diverted to secondary travel path 232. In another example, residue flowing along secondary travel path 232 may be intermittently stopped, while sensor 172L takes a measurement or sensor reading, and then released. These are only examples of how residue can be controlled in secondary travel path 232.

FIG. 6 shows that, after the residue travels past the sensor location 172L, the residue can be expelled from the agricultural harvester 100 to the ground, as indicated by arrow 234. In another example, the residue can be reintroduced into the primary travel path 230, after it is sensed by sensor 172 at location 172L or at a different location in the secondary travel path 232.

Figure 7:
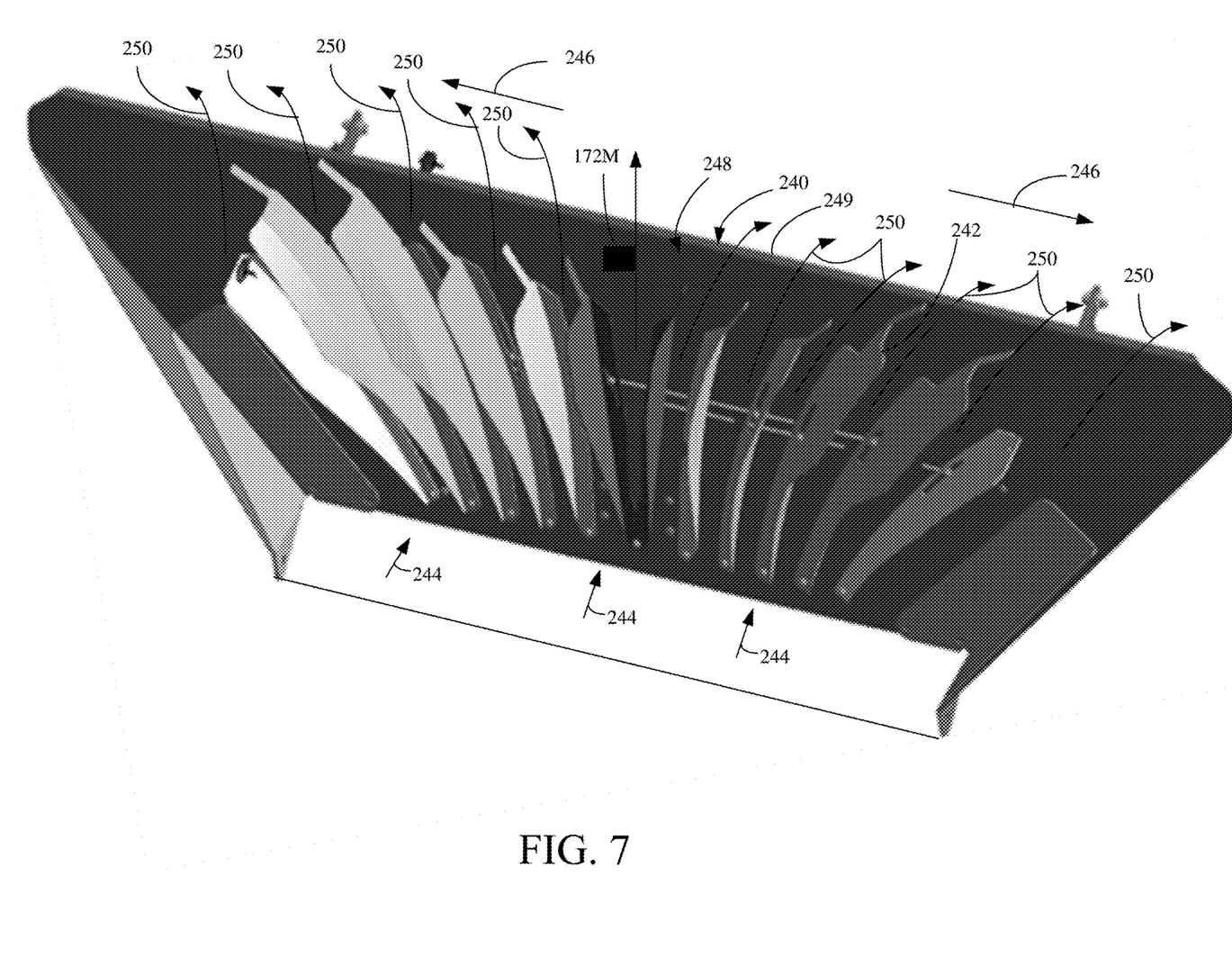
FIG. 7 is a view of a fixed tail board configured with a plurality of fixed vanes that spread residue as the residue exits from a chopper on a combine harvester with a residue sensor mounted to the tail board.

FIG. 7 shows an enlarged view of one example of a passive spreading system, which includes tail board 240 (shown above in FIG. 1C) which includes a hood 248 that is coupled to a plurality of protruding vanes 242 that protrude from hood 248 into the residue travel path. The vanes 242 are curved so that residue entering the tail board 240 as indicated by arrows 244 is dispersed generally outwardly in the directions indicated by arrows 246, as the residue exits through the outlet end 249 of the tail board 240. For instance, instead of having an active or rotatable spreader 142 shown in FIG. 1A, spreader 142 may be replaced by tail board 240 so that as residue exits the chopper 140, the residue travels along a travel path so the residue engages the vanes 242 on the hood 248 of tail board 240. The residue thus spreads out (relative to the direction of travel indicated by arrow 145) in a transverse direction indicated by arrows 246 as the residue is expelled from agricultural harvester 100. The travel path of the residue as influenced by vanes 242 is illustrated by the arrows 250 in FIG. 7. Also, FIG. 7 shows that sensor 172 can be mounted to the hood 248 of tail board 240 in a location such as that illustrated by 172M in FIG. 7. Again, the sensor surface of the sensor 172 in location 172M may be mounted flush with (or coplanar with) the residue-facing surface of hood 248 (or recessed from the residue-facing surface in a direction away from the residue travel path) to reduce the likelihood of any impacts of residue on the sensor surface of sensor 172.

The vanes 242 may be fixed or movable. When vanes 242 are movable, their position may be set by an actuator to control the travel path of the residue to be spread more or less widely behind agricultural harvester 100.

It should also be noted that the different examples described herein can be combined in different ways. That is, parts of one or more examples can be combined with parts of one or more other examples. All of this is contemplated herein.

Although the subject matter has been described in language specific to structural features and/or methodological acts, it is to be understood that the subject matter defined in the 10 appended claims is not necessarily limited to the specific features or acts described above. Rather, the specific features and acts described above are disclosed as example forms of implementing the claims.

What is claimed is:

1. An agricultural harvester comprising:
a header configured to engage crop material in a field;
a conveyor configured to move the crop material into the agricultural harvester;
a crop processing system configured to separate harvest material from residue;
a residue handling system configured to chop the residue to obtain chopped residue and remove the chopped residue from the agricultural harvester, wherein the residue handling system comprises a spreader housing and a spreader mounted to the spreader housing; and
a residue sensor mounted to the to the spreader housing downstream of the spreader along a residue travel path and configured to sense a characteristic of the residue and to generate a sensor signal indicative of the sensed characteristic of the residue.

2. The agricultural harvester of claim 1 and further comprising an additional residue sensor that includes a sensor surface exposed to the residue travel path and further comprising:
an air nozzle mounted to the housing to direct air flow across the sensor surface of the residue sensor.

3. The agricultural harvester of claim 2, wherein the residue handling system comprises:
a ramp upstream of the air nozzle along the residue travel path and upstream of the additional residue sensor along the residue travel path to divert residue from contacting the air nozzle and the additional residue sensor.

4. The agricultural harvester of claim 1, wherein the residue travel path comprises a primary residue travel path along a first trajectory and a secondary residue travel path along a second trajectory, the second trajectory being different from the first trajectory.

5. The agricultural harvester of claim 4 and further comprising an additional residue sensor that is configured to sense a characteristic of residue in the secondary residue travel path.

6. The agricultural harvester of claim 1, wherein the residue handling system further includes:
a chopper housing that includes a sidewall:
a chopper mounted to the chopper housing and configured to chop the residue, and
an additional residue sensor that is coupled to the sidewall of the chopper housing.

7. The agricultural harvester of claim 6, wherein the additional residue sensor includes a sensor surface exposed to the residue travel path, wherein the sidewall of the chopper housing includes a residue-facing surface that is a first distance from a portion of the residue travel path, and wherein the additional residue sensor is mounted to the sidewall of the chopper housing such that the sensor surface is spaced a second distance from the portion of the residue travel path, the second distance being equal to or greater than the first distance from the portion of the residue travel path.

8. The agricultural harvester of claim 7, wherein the additional residue sensor is mounted to the sidewall of the chopper housing such that the sensor surface is coplanar with the residue-facing surface of the chopper housing.

9. The agricultural harvester of claim 1, wherein the spreader housing includes a residue-facing wall and wherein the residue sensor is mounted to the residue-facing wall.

10. The agricultural harvester of claim 1, wherein the spreader housing includes a floor and wherein the residue sensor is mounted to the floor of the spreader housing and is configured to sense the characteristic of the residue in an interior of the spreader housing.

11. The agricultural harvester of claim 1, wherein the spreader housing includes a shroud and wherein the residue sensor is mounted to the shroud.

12. The agricultural harvester of claim 11, wherein the shroud is movable relative to the spreader housing.

13. The agricultural harvester of claim 1, wherein the spreader comprises structural vanes, wherein the spreader housing includes a ceiling, and wherein the residue sensor is mounted to the ceiling downstream of the structural vanes.

14. The agricultural harvester of claim 1, wherein the residue sensor comprises an optical sensor configured to capture an image of the residue.

15. A residue handling system on an agricultural harvester, the agricultural harvester separating harvest material from residue, the residue handling system comprising:
a spreader housing including a shroud;
a spreader mounted to the spreader housing and configured to spread residue on a field; and
a residue sensor coupled to the shroud downstream of the spreader along a residue travel path and configured to sense a characteristic of the residue and to generate a sensor signal indicative of the sensed characteristic of the residue.

16. The residue handling system of claim 15, wherein the shroud comprises a movable shroud configured to direct a trajectory of the residue as the residue exits the spreader.

17. An agricultural harvester comprising:
a header configured to engage crop material in a field;
a crop processing system configured to separate harvest material from residue;
a conveyor configured to move the crop material into the crop processing system;
a chopper housing having a sidewall;
a chopper mounted to the chopper housing and configured to chop the residue, wherein the sidewall is perpendicular to an axis of rotation of the chopper; and
an optical sensor coupled to the sidewall of the chopper housing and configured to capture an image indicative of a characteristic of the residue.

18. The agricultural harvester of claim 17, wherein the sidewall of the chopper housing includes a residue-facing surface, wherein the optical sensor includes a sensor surface, wherein the optical sensor is configured to capture the image through the sensor surface, and wherein the sensor surface is coplanar with the residue-facing surface of the sidewall.

19. The agricultural harvester of claim 17, wherein the optical sensor is mounted to a location on the sidewall, the location between the chopper and a spreader of the agricultural header.

20. The agricultural harvester of claim 17, wherein the optical sensor is mounted to a location on the sidewall within a rotational perimeter of the chopper.

* * * * *